US009756445B2

(12) United States Patent
Wang et al.

(10) Patent No.: US 9,756,445 B2
(45) Date of Patent: Sep. 5, 2017

(54) ADAPTIVE AUDIO CONTENT GENERATION

(71) Applicant: Dolby Laboratories Licensing Corporation, San Francisco, CA (US)

(72) Inventors: Jun Wang, Beijing (CN); Lie Lu, Beijing (CN); Mingqing Hu, Beijing (CN); Dirk Jeroen Breebaart, Pyrmont (AU); Nicolas R. Tsingos, Palo Alto, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 14/900,117

(22) PCT Filed: Jun. 17, 2014

(86) PCT No.: PCT/US2014/042798
§ 371 (c)(1),
(2) Date: Dec. 18, 2015

(87) PCT Pub. No.: WO2014/204997
PCT Pub. Date: Dec. 24, 2014

(65) Prior Publication Data

US 2016/0150343 A1 May 26, 2016

Related U.S. Application Data

(60) Provisional application No. 61/843,643, filed on Jul. 8, 2013.

(30) Foreign Application Priority Data

Jun. 18, 2013 (CN) .......................... 2013 1 0246711

(51) Int. Cl.
*H04R 5/00* (2006.01)
*H04S 7/00* (2006.01)
(Continued)

(52) U.S. Cl.
CPC .............. *H04S 7/30* (2013.01); *G10L 19/008* (2013.01); *G10L 19/0204* (2013.01);
(Continued)

(58) Field of Classification Search
CPC ........ H04S 2400/11; H04S 5/005; H04S 7/30; H04S 3/002; H04S 2400/13;
(Continued)

(56) References Cited

U.S. PATENT DOCUMENTS 7,412,380 B1 * 8/2008 Avendano ............... G10L 21/00 381/1
7,680,288 B2 3/2010 Melchior
(Continued)

FOREIGN PATENT DOCUMENTS

| | | |
|---|---|---|
| GB | 2485979 | 6/2012 |
| KR | 10-2009-0026009 | 3/2009 |
| WO | 2012/125855 | 9/2012 |

OTHER PUBLICATIONS

Gundry, Kenneth "A New Active Matrix Decoder for Surround Sound" AES 19th International Conference: Surround Sound-Techniques, Technology, and Perception, Jun. 1, 2001, pp. 1-9.
(Continued)

*Primary Examiner* — Regina N Holder
(74) *Attorney, Agent, or Firm* — Roger S. Sampson; Weaver Austin Villeneuve & Sampson LLP

(57) ABSTRACT

Embodiments of the present invention relate to adaptive audio content generation. Specifically, a method for generating adaptive audio content is provided. The method comprises extracting at least one audio object from channel-based source audio content, and generating the adaptive audio content at least partially based on the at least one audio object. Corresponding system and computer program product are also disclosed.

21 Claims, 5 Drawing Sheets

(51) Int. Cl.

| | |
|---|---|
| ***G10L 19/008*** | (2013.01) |
| ***H04S 3/00*** | (2006.01) |
| ***G10L 21/0272*** | (2013.01) |
| ***G10L 19/20*** | (2013.01) |
| ***G10L 19/02*** | (2013.01) |
| *H04S 5/00* | (2006.01) |

(52) U.S. Cl.
CPC .......... *G10L 19/20* (2013.01); *G10L 21/0272* (2013.01); *H04S 3/002* (2013.01); *H04S 5/005* (2013.01); *H04S 2400/11* (2013.01); *H04S 2400/13* (2013.01); *H04S 2400/15* (2013.01); *H04S 2420/07* (2013.01)

(58) Field of Classification Search
CPC ............... H04S 2420/07; G10L 19/008; G10L 19/0204; G10L 19/20; G10L 21/0272
See application file for complete search history.

(56) References Cited

U.S. PATENT DOCUMENTS

| | | | | |
|---|---|---|---|---|
| 8,213,641 | B2 | 7/2012 | Faller | |
| 8,364,497 | B2 | 1/2013 | Beack | |
| 2009/0080666 | A1 | 3/2009 | Uhle | |
| 2011/0013790 | A1 | 1/2011 | Hilpert | |
| 2011/0015924 | A1 | 1/2011 | Gunel Hacihabiboglu | |
| 2011/0022402 | A1 | 1/2011 | Engdegard | |
| 2012/0294449 | A1 | 11/2012 | Beack | |
| 2012/0308049 | A1 | 12/2012 | Schreiner | |
| 2012/0314876 | A1 | 12/2012 | Vilkamo | |
| 2013/0101122 | A1 | 4/2013 | Yoo | |
| 2014/0139738 | A1 * | 5/2014 | Mehta | H04N 21/233 348/515 |

OTHER PUBLICATIONS

Merimaa, J. et al "Correlation-Based Ambience Extraction from Stereo Recordings" AES Convention, paper 7282, Oct. 2007, pp. 1-15.

Baek, Yong-Hyun, et al "Efficient Primary-Ambient Decomposition Algorithm for Audio Upmix" Audio Engineering Society, 133rd Convention, Oct. 26-29, 2012, San Francisco, CA, USA, pp. 1-7.

Briand, M. et al "Parametric Representation of Multichannel Audio Based on Principal Component Analysis", Proc. of the 19th Int. Conference on Digital Audio Effects, Montreal, Canada, Sep. 18-20, 2006, pp. 1-14.

Puntonet, C.G. et al "Non-negative Matrix Factor Deconvolution; Extraction of Multiple Sound Sources from Monophonic Inputs" ICA 2004, LNCS 3195, pp. 494-499, 2004.

Nikunen, J. et al "Multichannel Audio Upmixing by Time-Frequency Filtering Using Non-Negative Tensor Factorization", J. Audio Eng. Soc. vol. 60, No. 10, Oct. 2012, pp. 794-806.

* cited by examiner

ADAPTIVE AUDIO CONTENT GENERATION

CROSS-REFERENCE TO RELATED APPLICATIONS

This application claims the benefit of priority to Chinese Patent Application No. 201310246711.2 filed on 18 Jun. 2013 and U.S. Provisional Patent Application No. 61/843,643 filed on 8 Jul. 2013, both hereby incorporated by reference in its entirety.

TECHNOLOGY

The preset invention generally relates to audio signal processing, and more specifically, to adaptive audio content generation.

BACKGROUND

At present, audio content is generally created and stored in channel-based formats. For example, stereo, surround 5.1, and 7.1 are channel-based formats for audio content. With developments in the multimedia industry, three-dimensional (3D) movies, television content, and other digital multimedia content are getting more and more popular. The traditional channel-based audio formats, however, are often incapable of generating immersive and lifelike audio content to follow such progress. It is therefore desired to expand multi-channel audio systems to create more immersive sound field. One of important approaches to achieve this objective is the adaptive audio content.

Compared with the conventional channel-based formats, the adaptive audio content takes advantageous of both audio channels and audio objects. The term "audio objects" as used herein refer to various audio elements or sound sources existing for a defined duration in time. The audio objects may be dynamic or static. An audio object may be human, animals or any other object serving as the sound source in the sound field. Optionally, the audio objects may have associated metadata such as information describing the position, velocity, and size of an object. Use of the audio objects enables the adaptive audio content to have high immersive sense and good acoustic effect, while allowing an operator such as a sound mixer to control and adjust audio objects in a convenient manner. Moreover, by means of audio objects, discrete sound elements can be accurately controlled, irrespective of specific playback speaker configurations. In the meantime, the adaptive audio content may further include channel-based portions called "audio beds" and/or any other audio elements. As used herein, the term "audio beds" or "beds" refer to audio channels that are meant to be reproduced in pre-defined, fixed locations. The audio beds may be considered as static audio objects and may have associated metadata as well. In this way, the adaptive audio content may take advantages of the channel-based format to represent complex audio textures, for example.

Adaptive audio content is generated in a quite different way from the channel-based audio content. In order to obtain an adaptive audio content, a dedicated processing flow has to be employed from the very beginning to create and process audio signals. However, due to constraints in terms of physical devices and/or technical conditions, not all audio content providers are capable of generating such adaptive audio content. Many audio content providers can only produce and provide channel-based audio content. Furthermore, it is desirable to create the three-dimensional (3D) experience for the channel-based audio content which has already been created and published. However, there is no solution capable of generating the adaptive audio content by converting the great amount of channel-based conventional audio content.

In view of the foregoing, there is a need in the art for a solution for converting channel-based audio content into adaptive audio content.

SUMMARY

In order to address the foregoing and other potential problems, the present invention proposes a method and system for generating adaptive audio content.

In one aspect, embodiments of the present invention provide a method for generating adaptive audio content. The method comprises: extracting at least one audio object from channel-based source audio content; and generating the adaptive audio content at least partially based on the at least one audio object. Embodiments in this regard further comprise a corresponding computer program product.

In another aspect, embodiments of the present invention provide a system for generating adaptive audio content. The system comprises: an audio object extractor configured to extract at least one audio object from channel-based source audio content; and an adaptive audio generator configured to generate the adaptive audio content at least partially based on the at least one audio object.

Through the following description, it would be appreciated that in accordance with embodiments of the present invention, conventional channel-based audio content may be effectively converted into adaptive audio content while guaranteeing high fidelity. Specifically, one or more audio objects can be accurately extracted from the source audio content to represent sharp and dynamic sounds, thereby allowing control, edit, playback, and/or re-authoring of individual primary sound source objects. In the meantime, complex audio textures may be of a channel-based format to support efficient authoring and distribution. Other advantages achieved by embodiments of the present invention will become apparent through the following descriptions.

DESCRIPTION OF DRAWINGS

Through reading the following detailed description with reference to the accompanying drawings, the above and other objectives, features and advantages of embodiments of the present invention will become more comprehensible. In the drawings, several embodiments of the present invention will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
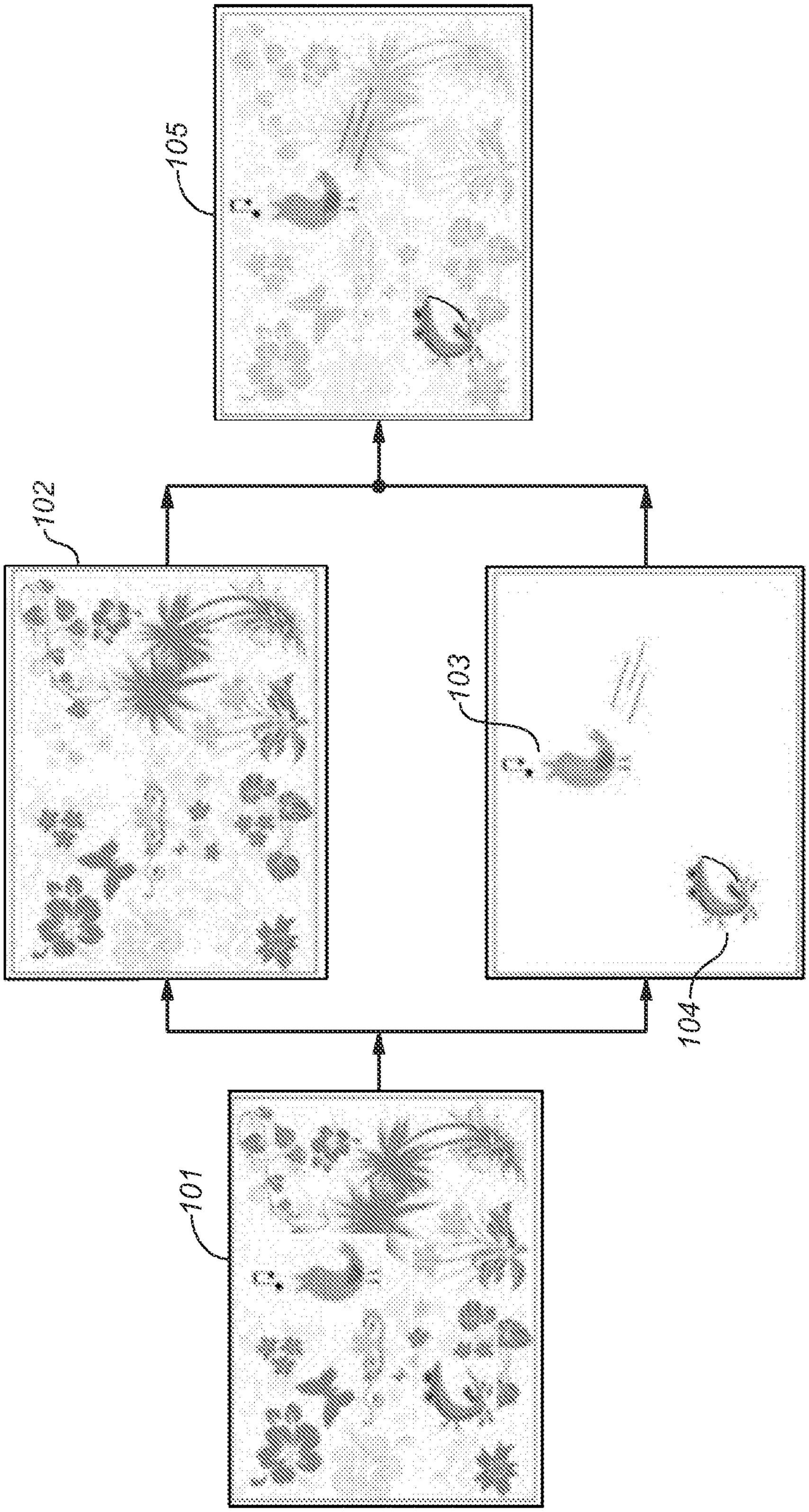
FIG. 1 illustrates a diagram of adaptive audio content in accordance with an example embodiment of the present invention.

The principle and spirit of the present invention will now be described with reference to various example embodiments illustrated in the drawings. It should be appreciated that depiction of these embodiments is only to enable those skilled in the art to better understand and further implement the present invention, not intended for limiting the scope of the present invention in any manner.

Reference is first made to FIG. 1, where a diagram of adaptive audio content in accordance with an embodiment of the present invention is shown. In accordance with embodiments of the present invention, the source audio content 101 to be processed is of a channel-based format such as stereo, surround 5.1, surround 7.1, and the like. Specifically, in accordance with embodiments of the present invention, the source audio content 101 may be either any type of final mix, or groups of audio tracks that can be processed separately prior to be combined into a final mix of traditional stereo or multi-channel content. The source audio content 101 is processed to generate two portions, namely, channel-based audio beds 102 and audio objects 103 and 104. The audio beds 102 may use channels to represent relatively complex audio textures such as background or ambiance sounds in the sound field for efficient authoring and distribution. The audio objects may be primary sound sources in the sound field such as sources for sharp and/or dynamic sounds. In the example shown in FIG. 1, the audio objects include a bird 103 and a frog 104. The adaptive audio content 105 may be generated based on the audio beds 102 and the audio objects 103 and 104.

It should be noted that in accordance with embodiments of the present invention, the adaptive audio content is not necessarily composed of the audio objects and audio beds. Instead, some adaptive audio content may only contain one of the audio objects and audio beds. Alternatively, the adaptive audio content may contain additional audio elements of any suitable formats other than the audio objects and/or beds. For example, some adaptive audio content may be composed of audio beds and some object-like content, for example, a partial object in spectral. The scope of the present invention is not limited in this regard.

Figure 2:
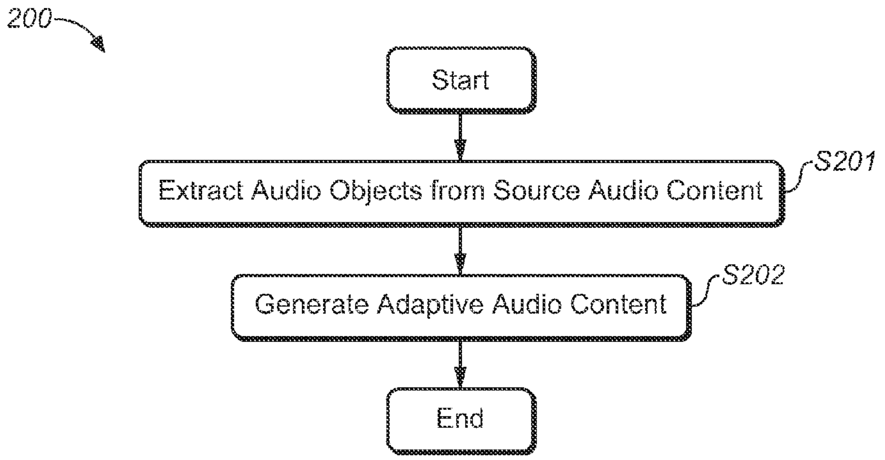
FIG. 2 illustrates a flowchart of a method for generating adaptive audio content in accordance with an example embodiment of the present invention.

Referring to FIG. 2, a flowchart of a method 200 for generating adaptive audio content in accordance with an example embodiment of the present invention is shown. After the method 200 starts, at least one audio object is extracted from channel-based audio content at step S201. For the sake of discussion, the input channel-based audio content is referred to as "source audio content." In accordance with embodiments of the present invention, it is possible to extract the audio objects by directly processing audio signals of the source audio content. Alternatively, in order to better preserve the spatial fidelity of the source audio content, for example, pre-processing such as signal decomposition may be performed on the signals of the source audio content, such that the audio objects may be extracted from the pre-processed audio signals. Embodiments in this regard will be detailed below.

In accordance with embodiments of the present invention, any appropriate approaches may be used to extract the audio objects. In general, signal components belonging to the same object in the audio content may be determined based on spectrum continuity and spatial consistency. In implementation, one or more signal features or cues may be obtained by processing the source audio content to thereby measure whether the sub-bands, channels, or frames of the source audio content belong to the same audio object. Examples of such audio signal features may include, but not limited to: sound direction/position, diffusiveness, direct-to-reverberant ratio (DRR), on/offset synchrony, harmonicity, pitch and pitch fluctuation, saliency/partial loudness/energy, repetitiveness, etc. Any other appropriate audio signal features may be used in connection with embodiments of the present invention, and the scope of the present invention is not limited in this regard. Specific embodiments of audio object extraction will be detailed below.

The audio objects extracted at step S201 may be of any suitable form. For example, in some embodiments, an audio object may be generated as a multi-channel sound track including signal components with similar audio signal features. Alternatively, the audio object may be generated as a down-mixed mono sound track. It is noted that these are only some examples and the extracted audio object may be represented in any appropriate form. The scope of the present invention is not limited in this regard.

The method 200 then proceeds to step S202, where the adaptive audio content is generated at least partially based on the at least one audio object extracted at step S201. In accordance with some embodiments, the audio objects and possibly other audio elements may be packaged into a single file as the resulting adaptive audio content. Such additional audio elements may include, but not limited to, channel-based audio beds and/or audio contents in any other formats. Alternatively, the audio objects and the additional audio elements may be distributed separately and then combined by a playback system to adaptively reconstruct the audio content based on the playback speaker configuration.

Specifically, in accordance with some embodiments, in generating the adaptive audio content, it is possible to perform re-authoring process on the audio objects and/or other audio elements (if any). The re-authoring process, for example, may include separating the overlapped audio objects, manipulating the audio objects, modifying attributes of the audio objects, controlling gains of the adaptive audio content, and so forth. Embodiments in this regard will be detailed below.

The method 200 ends after step S202, in this particular example. By executing the method 200, the channel-based audio content may be converted into the adaptive audio content, in which sharp and dynamic sounds may be represented by the audio objects while those complex audio textures like background sounds may be represented by other formats, for example, represented as the audio beds. The generated adaptive audio content may be efficiently distributed and played back with high fidelity by various kinds of playback system configurations. In this way, it is possible to take advantages of both the object-based and other formats like channel-based formats.

Figure 3:
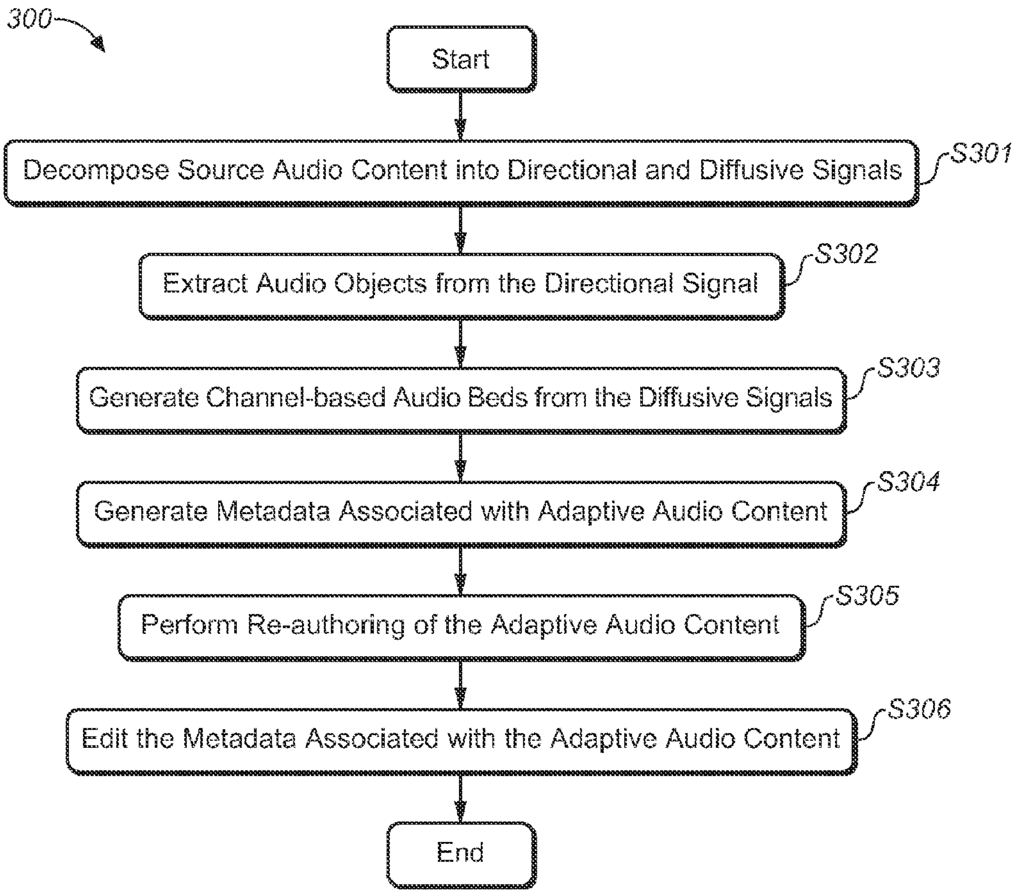
FIG. 3 illustrates a flowchart of a method for generating adaptive audio content in accordance with another example embodiment of the present invention.

Reference is now made to FIG. 3, which shows a flowchart of a method 300 for generating adaptive audio content in accordance with an example embodiment of the present invention. It should be appreciated that the method 300 may be considered as a specific embodiment of the method 200 as described above with reference to FIG. 2.

After the method 300 starts, at step S301, the decomposition of directional audio signals and diffusive audio signals is performed on the channel-based source audio content, such that the source audio content is decomposed into directional audio signals and diffusive audio signals. By means of signal decomposition, subsequent extraction of the audio objects and generation of the audio beds may be more accurate and effective. Specifically, the resulting directional audio signals may be used to extract audio objects, while the diffusive audio signals may be used to generate the audio beds. In this way, a good immersive sense can be achieved while ensuring a higher fidelity of the source audio content. Additionally, it helps to implement flexible object extraction and accurate metadata estimation. Embodiments in this regard will be detailed below.

The directional audio signals are primary sounds that are relatively easily localizable and panned among channels. Diffusive signals are those ambient signals weakly correlated with the directional sources and/or across channels. In accordance with embodiments of the present invention, at step S301, the directional audio signals in the source audio content may be extracted by any suitable approaches, and the remaining signals are diffusive audio signals. Approaches for extracting the directional audio signals may include, but not limited to, principal components analysis (PCA), independent component analysis, B-format analysis, and the like. Considering the PCA based approach as an example, it can operate on any channel configurations by performing probability analysis based on pairs of eigenvalues. For example, for the source audio content with five channels including left (L), right (R), central (C), left surround (Ls), and right surround (Rs) channels, the PCA may be applied on several pairs (for example, ten pairs) of channels, respectively, with the respective stereo directional signals and diffusive signals output.

Traditionally, the PCA-based separation is usually applied to two-channel pairs. In accordance with embodiments of the present invention, the PCA may be extended to multi-channel audio signals to achieve more effective signal component decomposition of the source audio content. Specifically, for the source audio content including C channels, it is assumed that D directional sources are distributed over the C channels, and that C diffusive audio signals, each of which is represented by one channel, are weakly correlated with directional sources and/or across C channels. In accordance with embodiments of the present invention, the model of each channel may be defined as a sum of an ambient signal and directional audio signals which are weighted in accordance with their spatial perceived positions. The time domain multichannel signal $X_C=(x_1, \ldots, x_c)^T$ may be represented as:

$$X_c(t) = \sum_{d=1}^{D} [g_{c,d}(t) \cdot S_d(t)] + A_c(t)$$

wherein c∈[1, . . . , C], and $g_{c,d}(t)$ represents a panning gain applied to the directional sources $S_D=(S_1, \ldots, S_D)^T$ of the cth channel. The diffusive audio signals $A_C=(A_1, \ldots, A_c)^T$ are distributed over all the channels.

Based on the above model, the PCA may be applied on the Short Time Fourier Transform (STFT) signals per frequency sub-band. Absolute values of the STFT signal are denoted as $X_{b,t,c}$, where b∈[1, . . . , B] represents the STFT frequency bin index, t∈[1, . . . , T] represents the STFT frame index, and c∈[1, . . . , C] represents the channel index.

For each frequency band b∈[1, . . . , B] (for sake of discussion, b is omitted for the following symbols), a covariance matrix with respect to the source audio content may be calculated, for example, by computing correlations among the channels. The resulting C*C covariance matrix may be smoothed with an appropriate time constant. Then eigenvector decomposition is performed to obtain eigenvalues $\lambda_1>\lambda_2>\lambda_3> \ldots >\lambda_C$ and eigenvectors $v_1, v_2, \ldots, v_C$. Next, for each channel c=1 . . . C, the pair of eigenvalue $\lambda_c$, $\lambda_{c+1}$ are compared, and a z-score is calculated:

$$z=\text{abs}(\lambda_c-\lambda_{c+1})/(\lambda_c+\lambda_{c+1}),$$

wherein abs represents an absolution function. Then the probability for diffusivity or ambiance may be calculated by analyzing the decomposed signal components. Specifically, larger $z$ indicates smaller probability for diffusivity. Based on the z-score, the probability for diffusivity may be calculated in a heuristic manner based on a normalized cumulative distribution function (cdf)/complementary error function (erfc):

$$p = \text{erfc}\left(-\frac{z}{\sqrt{2}}\right).$$

In the meantime, the probability for diffusivity for channel c is updated as follows:

$$p_c=\max(p_c,p)$$

$$p_{c+1}=\max(p_{c+1},p).$$

We denote the final diffusive audio signal as $A_c$ and the final directional audio signal as $S_c$. Thus, for each channel c, $$A_c=X_c \cdot p_c$$

$$S_c=X_c \cdot (1-p_c).$$

It should be noted that the above description is only an example and should not be constructed as a limitation to the scope of the present invention. For example, any other process or metric based on comparison of eigenvalues of the covariance or correlation matrix of the signals may be used to estimate the amount of diffuseness or diffuseness component level of the signals such as by their ratio, difference, quotient, and the like. Moreover, in some embodiments, signals of the source audio content may be filtered, and then the covariance is estimated based on the filtered signal. As an example, the signals may be filtered by a quadrature mirror filter. Alternatively or additionally, the signals may be filtered or band-limited by any other filtering means. In some other embodiments, envelopes of the signals of the source audio content may be used to calculate the covariance or correlation matrix.

Continuing reference to FIG. 3, the method 300 then proceeds to step S302, where at least one audio object is extracted from the directional audio signals obtained at step S301. Compared with directly extracting audio objects from the source audio content, extracting audio objects from the directional audio signals may remove the interference by the diffusive audio signal components, such that the audio object extraction and metadata estimation can be performed more accurately. Moreover, by applying further directional and diffusive signal decomposition, the diffusiveness of the extracted objects may be adjusted. It also helps to facilitate the re-authoring process of the adaptive audio content, which will be described below. It should be appreciated that the scope of the present invention is not limited to extracting audio objects from the directional audio signals. Various operations and features as described herein are as well applicable to the original signal of the source audio content or any other signal components decomposed from the original audio signal.

In accordance with embodiments of the present invention, the audio object extraction at step S302 may be done by a spatial source separation process, which process may be performed in two steps. First, spectrum composition may be conducted on each of multiple or all frames of the source audio content. The spectrum composition is based on the assumption that if an audio object exists in more than one channel, its spectrum in these channels tends to have high similarities in terms of envelop and spectral shape. Therefore, for each frame, the whole frequency range may be divided into multiple sub-bands, and then the similarities between these sub-bands are measured. In accordance with embodiments of the present invention, for audio content with a relatively shorter duration (for example, less than 80 ms), it is possible to compare the similarity of spectrum between sub-bands. For audio content with longer duration, the sub-band envelop coherence may be compared. Any other suitable sub-band similarity metrics are possible as well. Then various clustering techniques may be applied to aggregate the sub-bands and channels from the same audio object. For example, in one embodiment, a hierarchical clustering technique may be applied. Such technique sets a threshold of the lowest similarity score, and then automatically identifies similar channels and the number of clusters based on the comparison with the threshold. As such, channels containing the same object can be identified and aggregated in each frame.

Next, for the channels containing the same object as identified and aggregated in the single-frame object spectrum composition, temporal composition may be performed across the multiple frames so as to composite a complete audio object along time. In accordance with embodiments of the present invention, any suitable techniques, no matter already known or developed in the future, may be applied to composite the complete audio objects across multiple frames. Examples of such techniques include, but not limited to: dynamic programming, which aggregates the audio object components by using a probabilistic framework; clustering, which aggregates components from the same audio object, based on their feature consistency and temporal constraints; multi-agent technique which can be applied to track the occurrence of multiple audio objects, as different audio objects usually show and disappear at different time points; Kalman filtering, which may track audio objects over time, and so forth.

It should be appreciated that for the single-frame spectrum composition or multi-frame temporal composition as described above, whether the sub-bands/channels/frames contain the same audio object may be determined based on spectral continuity and spatial consistency. For example, in the multi-frame temporal composition processing such as clustering and dynamic programming, audio objects may be aggregated based on one or more of the following so as to form a temporal complete audio object: direction/position, diffusiveness, DDR, on/offset synchrony, harmonicity modulations, pitch and pitch fluctuation, saliency/partial loudness/energy, repetitiveness, and the like.

Specifically, in accordance with embodiments of the present invention, the diffusive audio signal $A_c$ (or a portion thereof) as obtained at step S301 may be regarded as one or more audio objects. For example, each of the individual signals $A_c$ may be output as an audio object with a position corresponding to the assumed location of the corresponding loudspeaker. Alternatively, the signals $A_c$ may be down mixed to create a mono signal. Such mono signal may be labeled as being diffuse or having a large object size in its associated metadata. On the other hand, after performing the audio object extraction on the directional signals, there may be some residual signals. In accordance with some embodiments, such residual signals components may be put into the audio beds as described below.

We continue reference to FIG. 3, at step S303, channel-based audio beds are generated based on the source audio content. It should be noted that though the audio bed generation is shown to be performed after the audio object extraction, the scope of the present invention is not limited in this regard. In alternative embodiments, the audio beds may be generated prior to or parallel with the extraction of the audio objects.

Generally speaking, the audio beds contain the audio signal components represented in a channel-based format. In accordance with some embodiments, as discussed above, the source audio content is decomposed at step S301. In such embodiments, the audio beds may be generated from the diffusive signals decomposed from the source audio content. That is, the diffusive audio signals may be represented in channel-based format to serve as the audio beds. Alternatively or additionally, it is possible to generate the audio beds from the residual signal components after the audio objects extraction.

Specifically, in accordance with some embodiments, in addition to the channels present in the source audio contents, one or more additional channels may be created to make the generated audio beds more immersive and lifelike. For example, it is known that the traditional channel-based audio content usually does not include height information. In accordance with some embodiments, at least one height channel may be created by applying ambiance upmixer at step S303 such that the source audio information is extended. In this way, the generated audio beds will be more immersive and lifelike. Any suitable upmixers, such as Next Generation Surround or Pro logic IIx decoder, may be used in connection with embodiments of the present invention. Considering the source audio content of the surround 5.1 format as an example, a passive matrix may be applied to the Ls and Rs outputs to create out-of-phase components of the Ls and Rs channels in the ambiance signal, which will be used as the height channels Lvh and Rvh, respectively.

Figure 4:
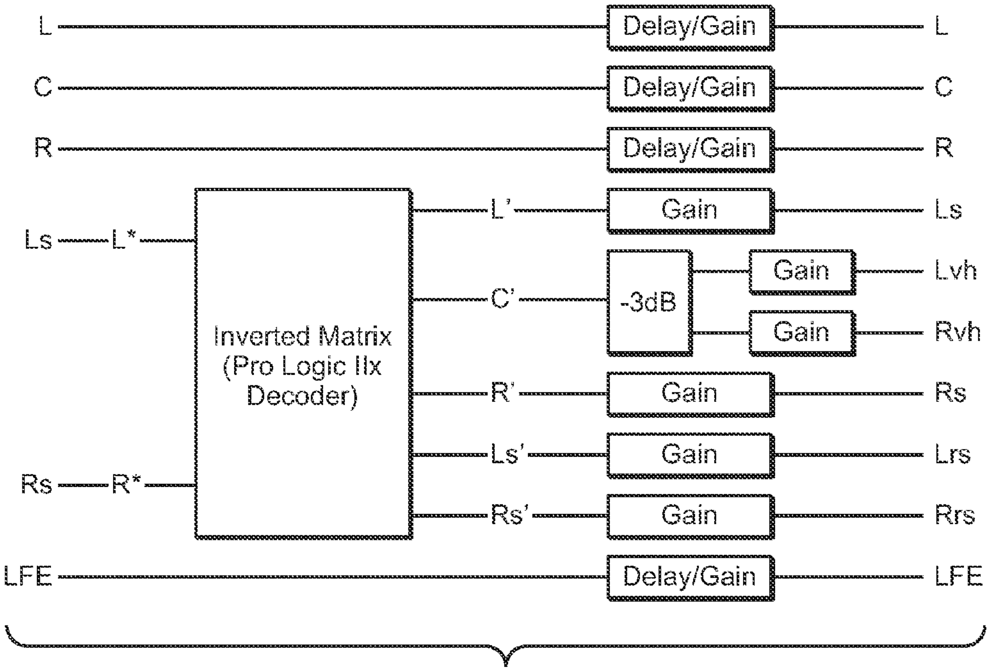
FIG. 4 illustrates a diagram of generating audio beds in accordance with an example embodiment of the present invention.

With reference to FIG. 4, in accordance with some embodiments, the upmixing may be done in the following two stages. First, out-of-phase content in the Ls and Rs channels may be calculated and redirected to the height channels, thereby creating a single height output channel C'. Then the channels L', R', Ls' and Rs' are calculated. Next, the channels L', R', Ls', and Rs' are mapped to the Ls, Rs, Lrs, and Rrs outputs, respectively. Finally, the derived height channel C' is attenuated, for example, by 3 dB and is mapped to the Lvh and Rvh outputs. As such, the height channel C' is split to feed two height speaker outputs. Optionally, delay and gain compensation may be applied to certain channels.

In accordance with some embodiments, the upmixing process may comprise the use of decorrelators to create additional signals that are mutually independent from their input(s). The decorrelators may comprise, for example, all-pass filters, all-pass delay sections, reverberators, and so forth. In these embodiments, the signals Lvh, Rvh, Lrs, and Rrs may be generated by applying decorrelation to one or more of the signals L, C, R, Ls, and Rs. It should be appreciated that any upmixing technique, no matter already known or developed in the future, may be used in connection with embodiments of the present invention.

The channel-based audio beds are composed of the height channels created by ambiance upmixing and other channels of the diffusive audio signals in the source audio content. It should be appreciated that creation of height channels at step S303 is optional. For example, in accordance with some alternative embodiments, the audio beds may be directly generated based on the channels of the diffusive audio signals in the source audio content without channel extension. Actually, the scope of the present invention is not limited to generate the audio beds from the diffusive audio signals as well. As described above, in those embodiments where the audio objects are directly extracted from the source audio contents, the remaining signal after the audio object extraction may be used to generate the audio beds.

The method 300 then proceeds to step S304, where metadata associated with the adaptive audio content are generated. In accordance with embodiments of the present invention, the metadata may be estimated or calculated based on at least one of the source audio content, the one or more extracted audio objects, and the audio beds. The metadata may range from the high level semantic metadata till low level descriptive information. For example, in accordance with some embodiments, the metadata may include mid-level attributes including onsets, offsets, harmonicity, saliency, loudness, temporal structures, and so forth. Alternatively or additionally, the metadata may include high-level semantic attributes including music, speech, singing voice, sound effects, environmental sounds, foley, and so forth.

Specifically, in accordance with some embodiments, the metadata may comprise spatial metadata representing spatial attributes such as position, size, width, and the like of the audio objects. For example, when the spatial metadata to be estimated is the azimuth angle (denoted as $\alpha$, $0\leq\alpha<2\pi$) of the extracted audio object, typical panning laws (for example, the sine-cosine law) may be applied. In the sine-cosine law, the amplitude of the audio object may be distributed to two channels/speakers (denoted as $c_0$ and $c_1$) in the following way:

$$g_0=\beta\cdot\cos(\alpha')$$

$$g_1=\beta\cdot\sin(\alpha')$$

where $g_0$ and $g_1$ represent the amplitude of two channels, $\beta$ represents the amplitude of the audio object, and $\alpha'$ is its azimuth angle between the two channels. Correspondingly, based on the $g_0$ and $g_1$, the azimuth angle $\alpha'$ may be calculated as:

$$\alpha' = \arg\tan\left(\frac{g_1 - g_0}{g_1 + g_0}\right) + \pi/4$$

Thus, to estimate the azimuth angle $\alpha$ of an audio object, the top-two channels with highest amplitudes may be first detected, and the azimuth $\alpha'$ between these two channels are estimated. Then a mapping function may be applied to $\alpha'$ based on the indexes of the selected two channels to obtain the final trajectory parameter $\alpha$. The estimated metadata may give an approximate reference of the original creative intent of the source audio content in terms of spatial trajectory.

In some embodiments, the estimated position of an audio object may have an x and y coordinate in a Cartesian coordinate system, or may be represented by an angle. Specifically, in accordance with embodiments of the present invention, the x and y coordinates of an object can be estimated as:

$$p_x = \frac{\Sigma_c x_c g_c}{\Sigma_c g_c}$$

$$p_y = \frac{\Sigma_c y_c g_c}{\Sigma_c g_c}$$

where $x_c$ and $y_c$ are the x and y coordinates of the loudspeaker corresponding to the channel c.

The method 300 then proceeds to step S305, where the re-authoring process is performed on the adaptive audio content that may contains both the audio objects and the channel-based audio beds. It will be appreciated that there may be certain artifacts in the audio objects, the audio beds, and/or the metadata. As a result, it may be desirable to adjust or modify the results obtained at steps S301 to S304. Moreover, the end users may be given to have a certain control on the generated adaptive audio content.

Figure 5A:
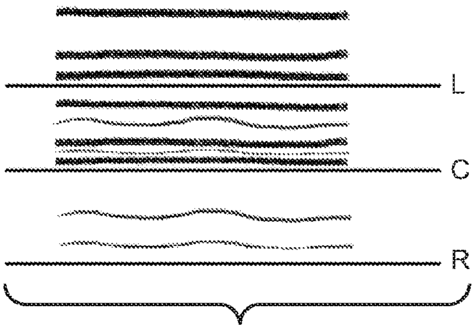
FIGS. 5A and 5B illustrate diagrams of overlapped audio objects in accordance with example embodiments of the present invention.
Figure 5B:
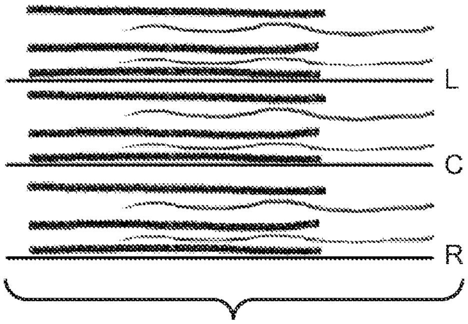

In accordance with some embodiments, the re-authoring process may comprise audio object separation which is used to separate the audio objects that are at least partially overlapped with each other among the extracted audio objects. It can be appreciated that in the audio objects extracted at step S302, two or more audio objects might be at least partially overlapped with one another. For example, FIG. 5A shows two audio objects that are overlapped in a part of channels (central C channel in this case), wherein one audio object is panned between L and C channels while the other is panned between C and R channels. FIG. 5B shows a scenario where two audio objects are partially overlapped in all channels.

In accordance with embodiments of the present invention, the audio object separation process may be an automatic process. Alternatively, the object separation process may be a semi-automatic process. A user interface such as a graphical user interface (GUI) may be provided such that the user may interactively select the audio objects to be separated, for example, by indicating a period of time in which there are overlapped audio objects. Accordingly, the object separation processing may be applied to the audio signals within that period of time. Any suitable techniques for separating audio objects, no matter already known or developed in the future, may be used in connection with embodiments of the present invention.

Moreover, in accordance with embodiments of the present invention, the re-authoring process may comprise controlling and modifying the attributes of the audio objects. For example, based on the separated audio objects and their respective time-dependent and channel-dependent gains $G_{r,t}$ and $A_{r,c}$, the energy level of the audio objects may be changed. In addition, it is possible to reshape the audio objects, for example, changing the width and size of an audio object.

Alternatively or additionally, the re-authoring process at step S305 may allow the user to interactively manipulate the audio object, for example, via the GUI. The manipulation may include, but not limited to, changing the spatial position or trajectory of the audio object, mixing the spectrum of several audio objects into one audio object, separating the spectrum of one audio object into several audio objects, concatenating several objects along time to form one audio object, slicing one audio object along time into several audio objects, and so forth.

Returning to FIG. 3, if the metadata associated with the adaptive audio content is estimated at step S304, then the method 300 may proceed to step S306 to edit such metadata. In accordance with some embodiments, the edit of the metadata may comprise manipulating spatial metadata associated with the audio objects and/or the audio beds. For example, the metadata such as spatial position/trajectory and width of an audio object may be adjusted or even re-estimated using the gains $G_{r,t}$ and $A_{r,c}$ of the audio object. For example, the spatial metadata described above may be updated as:

$$\alpha = \arg\tan\left(\frac{G\cdot A_1 - G\cdot A_0}{G\cdot A_1 + G\cdot A_0}\right) + \frac{\pi}{4}$$

where G represents the time-dependent gain of the audio object, and $A_0$ and $A_1$ represent the top-two highest channel-dependent gains of the audio object among different channels.

Figure 6:
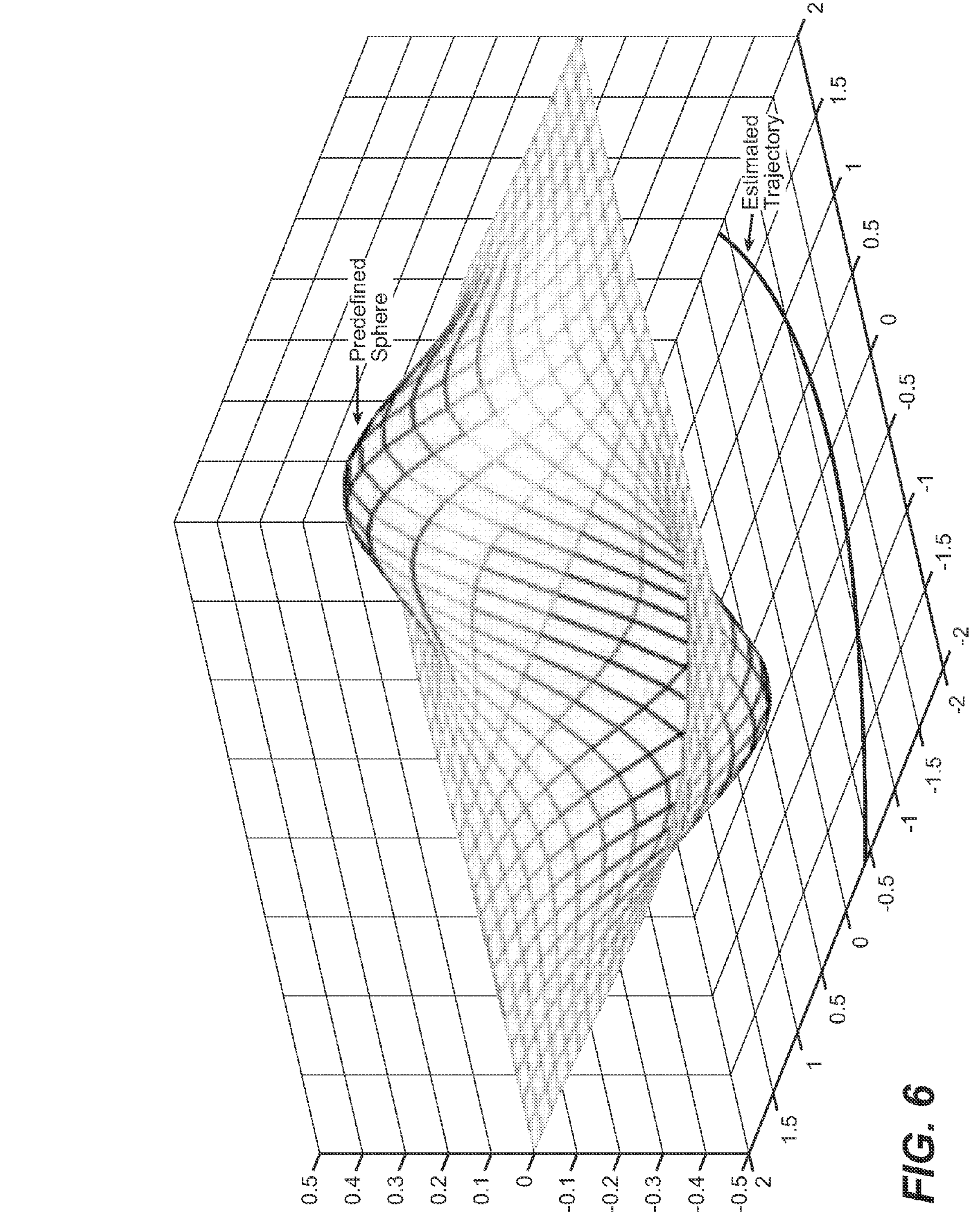
FIG. 6 illustrates a diagram of metadata edit in accordance with an example embodiment of the present invention.

Further, the spatial metadata may be used as the reference in ensuring the fidelity of the source audio content, or serve as a base for new artistic creation. For example, an extracted audio object may be re-positioned by modifying the associated spatial metadata. For example, as shown in FIG. 6, the two-dimensional trajectory of an audio object may be mapped to a predefined hemisphere by editing the spatial metadata to generate a three-dimensional trajectory.

Alternatively, in accordance with some embodiments, the metadata edit may include controlling gains of the audio objects. Alternatively or additionally, the gain control may be performed for the channel-based audio beds. For example, in some embodiments, the gain control may be applied to the height channels that do not exist in the source audio content.

The method 300 ends after step S306, in this particular example.

As mentioned above, although various operations described in method 300 may facilitate the generation of the adaptive audio content, one or more of them may be omitted in some alternative embodiments of the present invention. For example, without performing directional/diffusive signal decomposition, the audio objects may be directly extracted from the signals of the source audio content, and channel-based audio beds may be generated from the residual signals after the audio object extraction. Moreover, it is possible not to generate the additional height channels. Likewise, the generation of the metadata and the re-authoring of the adaptive audio content are both optional. The scope of the present invention is not limited in these regards.

Figure 7:
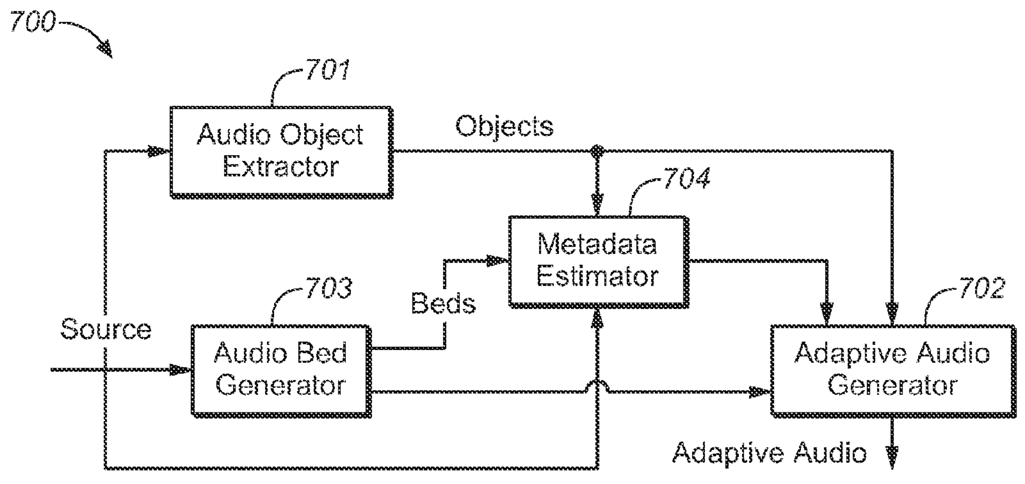
FIG. 7 illustrates a flowchart of a system for generating adaptive audio content in accordance with an example embodiment of the present invention.

Referring to FIG. 7, a block diagram of a system 700 for generating adaptive audio content in accordance with one example embodiment of the present invention is shown. As shown, the system 700 comprises: an audio object extractor 701 configured to extract at least one audio object from channel-based source audio content; and an adaptive audio generator 702 configured to generate the adaptive audio content at least partially based on the at least one audio object.

In accordance with some embodiments, the audio object extractor 701 may comprise: a signal decomposer configured to decompose the source audio content into a directional audio signal and a diffusive audio signal. In these embodiments, the audio object extractor 701 may be configured to extract the at least one audio object from the directional audio signal. In some embodiments, the signal decomposer may comprise: a component decomposer configured to perform signal component decomposition on the source audio content; and a probability calculator configured to calculate probability for diffusivity by analyzing the decomposed signal components.

Alternatively or additionally, in accordance with some embodiments, the audio object extractor 701 may comprise: a spectrum composer configured to perform, for each of a plurality of frames in the source audio content, spectrum composition to identify and aggregate channels containing a same audio object; and a temporal composer configured to perform temporal composition of the identified and aggregated channels across the plurality of frames to form the at least one audio object along time. For example, the spectrum composer may comprise a frequency divisor configured to divide, for each of the plurality of frames, a frequency range into a plurality of sub-bands. Accordingly, the spectrum composer may be configured to identify and aggregate the channels containing the same audio object based on similarity of at least one of envelop and spectral shape among the plurality of sub-bands.

In accordance with some embodiments, the system 700 may comprise an audio bed generator 703 configured to generate a channel-based audio bed from the source audio content. In such embodiments, the adaptive audio generator 702 may be configured to generate the adaptive audio content based on the at least one audio object and the audio bed. In some embodiments, as discussed above, the system 700 may comprise a signal decomposer configured to decompose the source audio content into a directional audio signal and a diffusive audio signal. Accordingly, the audio bed generator 703 may be configured to generate the audio bed from the diffusive audio signal.

In accordance with some embodiments, the audio bed generator 703 may comprise a height channel creator configured to create at least one height channel by ambiance upmixing the source audio content. In these embodiments, the audio bed generator 703 may be configured to generate the audio bed from a channel of the source audio content and the at least one height channel.

In accordance with some embodiments, the system 700 may further comprise a metadata estimator 704 configured to estimate metadata associated with the adaptive audio content. The metadata may be estimated based on the source audio content, the at least one audio object, and/or the audio beds (if any). In these embodiments, the system 700 may further comprise a metadata editor configured to edit the metadata associated with the adaptive audio content. Specifically, in some embodiments, the metadata editor may comprise a gain controller configured to control a gain of the adaptive audio content, for example, gains of the audio objects and/or the channel-based audio beds.

In accordance with some embodiments, the adaptive audio generator 702 may comprise a re-authoring controller configured to perform re-authoring to the at least one audio object. For example, the re-authoring controller may comprise at least one of the following: an object separator configured to separate audio objects that are at least partially overlapped among the at least one audio object; an attribute modifier configured to modify an attribute associated with the at least one audio object; and an object manipulator configured to interactively manipulate the at least one audio object.

For sake of clarity, some optional components of the system 700 are not shown in FIG. 7. However, it should be appreciated that the features as described above with reference to FIGS. 2-3 are all applicable to the system 700. Moreover, the components of the system 700 may be a hardware module or a software unit module. For example, in some embodiments, the system 700 may be implemented partially or completely with software and/or firmware, for example, implemented as a computer program product embodied in a computer readable medium. Alternatively or additionally, the system 700 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 8:
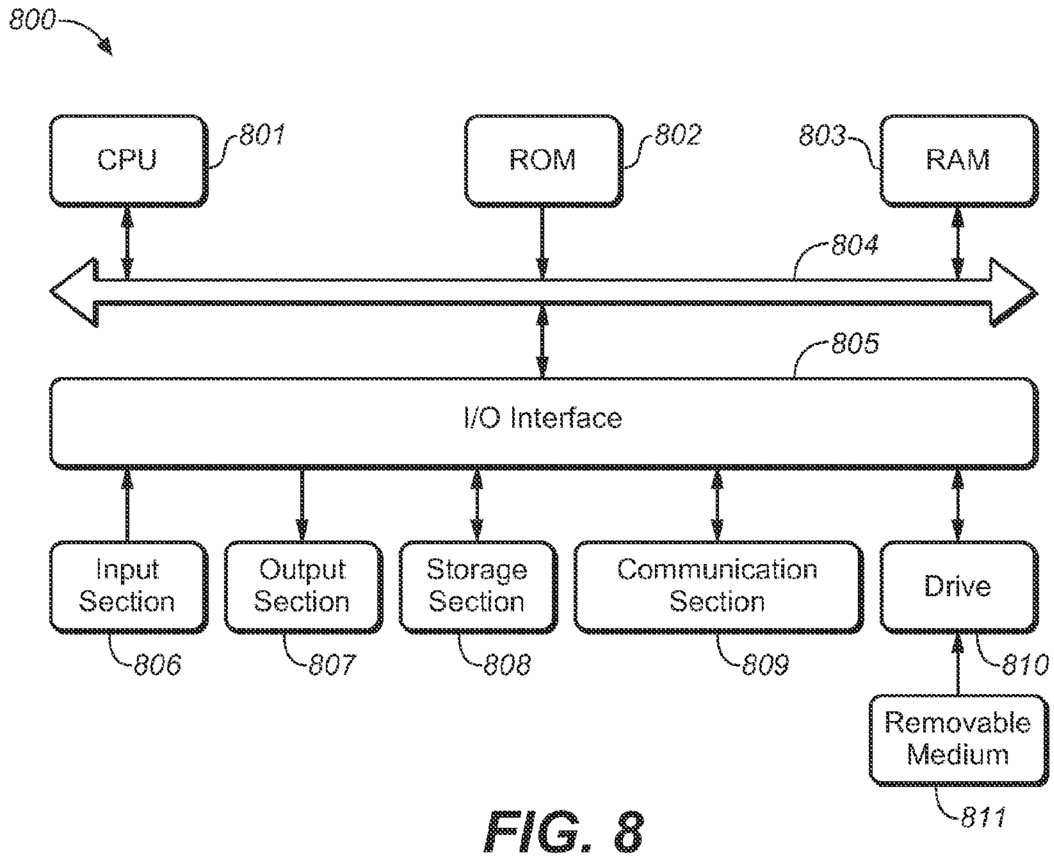
FIG. 8 illustrates a block diagram of an example computer system suitable for implementing embodiments of the present invention.

Referring to FIG. 8, a block diagram of an example computer system 800 suitable for implementing embodiments of the present invention is shown. As shown, the computer system 800 comprises a central processing unit (CPU) 801 which is capable of performing various processes in accordance with a program stored in a read only memory (ROM) 802 or a program loaded from a storage section 808 to a random access memory (RAM) 803. In the RAM 803, data required when the CPU 801 performs the various processes or the like is also stored as required. The CPU 801, the ROM 802 and the RAM 803 are connected to one another via a bus 804. An input/output (I/O) interface 805 is also connected to the bus 804.

The following components are connected to the I/O interface 805: an input section 806 including a keyboard, a mouse, or the like; an output section 807 including a display such as a cathode ray tube (CRT), a liquid crystal display (LCD), or the like, and a loudspeaker or the like; the storage section 808 including a hard disk or the like; and a communication section 809 including a network interface card such as a LAN card, a modem, or the like. The communication section 809 performs a communication process via the network such as the internet. A drive 810 is also connected to the I/O interface 805 as required. A removable medium 811, such as a magnetic disk, an optical disk, a magneto-optical disk, a semiconductor memory, or the like, is mounted on the drive 810 as required, so that a computer program read therefrom is installed into the storage section 808 as required.

Specifically, in accordance with embodiments of the present invention, the processes described above with reference to FIGS. 2-3 may be implemented as computer software programs. For example, embodiments of the present invention comprise a computer program product including a computer program tangibly embodied on a machine readable medium, the computer program including program code for performing method 200 and/or method 300. In such embodiments, the computer program may be downloaded and mounted from the network via the communication unit 809, and/or installed from the removable memory unit 811.

Generally speaking, various example embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present invention include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind to one skilled in the art to which these embodiments of the invention pertain having the benefit of the teachings presented in the foregoing descriptions and the drawings.

Accordingly, the present invention may be embodied in any of the forms described herein. For example, the following enumerated example embodiments (EEEs) describe some structures, features, and functionalities of some aspects of the present invention.

EEE 1. A method for generating adaptive audio content, the method comprising: extracting at least one audio object from channel-based source audio content; and generating the adaptive audio content at least partially based on the at least one audio object.

EEE 2. The method according to EEE 1, wherein extracting the at least one audio object comprises: decomposing the source audio content into a directional audio signal and a diffusive audio signal; and extracting the at least one audio object from the directional audio signal.

EEE 3. The method according to EEE 2, wherein decomposing the source audio content comprises: performing signal component decomposition on the source audio content; calculating probability for diffusivity by analyzing the decomposed signal components; and decomposing the source audio content based on the probability for diffusivity.

EEE 4. The method according to EEE 3, wherein the source audio content contains multiple channels, and wherein the signal component decomposition comprises: calculating the covariance matrix by computing correlations among the multiple channels; performing eigenvector decomposition on the covariance matrix to obtain eigenvectors and eigenvalues; and calculating the probability for diffusivity based on differences between pairs of contingent eigenvalues.

EEE 5. The method according to EEE 4, wherein the probability for diffusivity is calculated as $$p = \mathrm{erfc}\left(-\frac{z}{\sqrt{2}}\right),$$

wherein $z=\mathrm{abs}(\lambda_c-\lambda_{c+1})/(\lambda_c+\lambda_{c+1})$, $\lambda_1>\lambda_2>\lambda_3> \ldots >\lambda_C$ are the eigenvectors, abs represents an absolution function, and erfc represents a complementary error function.

EEE 6. The method according to EEE 5, further comprising: updating the probability for diffusive for channel c as $p_c=\max(p_c, p)$ and $p_{c+1}=\max(p_{c+1}, p)$.

EEE 7. The method according to any of EEEs 4 to 6, further comprising: smoothing the covariance matrix.

EEE 8. The method according to any of EEEs 3 to 7, wherein the diffusive audio signal is obtained by multiplying the source audio content with the probability for diffusivity, and the directional audio signal is obtained by subtracting the diffusive audio signal from the source audio content.

EEE 9. The method according to any of EEEs 3 to 8, wherein the signal component decomposition is performed based on cues of spectral continuity and spatial consistency including at least one of the: direction, position, diffusiveness, direct-to-reverberant ratio, on/offset synchrony, harmonicity modulations, pitch, pitch fluctuation, saliency, partial loudness, repetitiveness.

EEE 10. The method according to any of EEEs 1 to 9, further comprising: manipulating the at least one audio object in a re-authoring process, including at least one of the following: merging, separating, connecting, splitting, repositioning, reshaping, level-adjusting the at least one audio object; updating time-dependent gains and channel-dependent gains for the at least one audio object; applying an energy-preserved downmixing on the at least one audio object and gains to generate a mono object track; and incorporating residual signals into the audio bed.

EEE 11. The method according to any of EEEs 1 to 10, further comprising: estimating metadata associated with the adaptive audio content.

EEE 12. The method according to EEE 11, wherein generating the adaptive audio content comprises editing the metadata associated with the adaptive audio content.

EEE 13. The method according to EEE 12, wherein editing the metadata comprises re-estimating spatial position/trajectory metadata based on time-dependent gains and channel-dependent gains of the at least one audio object.

EEE 14. The method according to EEE 13, wherein the spatial metadata is estimated based on time-dependent and channel-dependent gains of the at least one audio object.

EEE 15. The method according to EEE 14, wherein the spatial metadata is estimated as $$\alpha = \mathrm{argtan}\left(\frac{G\cdot A_1 - G\cdot A_0}{G\cdot A_1 + G\cdot A_0}\right) + \frac{\pi}{4},$$

wherein G represents the time-dependent gain of the at least one audio object, and $A_0$ and $A_1$ represent top-two highest channel-dependent gains of the at least one audio object among different channels.

EEE 16. The method according to any of EEEs 11 to 15, wherein spatial position metadata and a pre-defined hemisphere shape are used to automatically generate a three-dimension trajectory by mapping the estimated two dimensional spatial position to the pre-defined hemisphere shape.

EEE 17. The method according to any of EEEs 11 to 16, further comprising: automatically generating a reference energy gain of the at least one audio object in a continuous way by referring to saliency/energy metadata.

EEE 18. The method according to any of EEEs 11 to 17, further comprising: creating a height channel by ambiance upmixing the source audio content; and generating channel-based audio beds from the height channel and surround channels of the source audio content.

EEE 19. The method according to EEE 18, further comparing: applying a gain control on the audio beds by multiplying energy-preserved factors to the height channel and the surround channels to modify a perceived hemisphere height of ambiance.

EEE 20. A system for generating adaptive audio content, comprising units configured to carry out the steps of the method according to any of EEEs 1 to 19.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for generating adaptive audio content, the method comprising:

extracting at least one audio object from channel-based source audio content, wherein extracting the at least one audio object comprises:

decomposing the source audio content into a directional audio signal and a diffusive audio signal, wherein decomposing the source audio content comprises performing signal component decomposition on the source audio content and calculating a probability for diffusivity by analyzing the decomposed signal components; and extracting the at least one audio object from the directional audio signal; and generating the adaptive audio content at least partially based on the at least one audio object.

2. The method according to claim 1, wherein extracting the at least one audio object comprises:

performing, for each of a plurality of frames in the source audio content, spectrum composition to identify and aggregate channels containing a same audio object; and performing temporal composition of the identified and aggregated channels across the plurality of frames to form the at least one audio object along time.

3. The method according to claim 2, wherein identifying and aggregating the channels containing the same audio object comprises:

dividing, for each of the plurality of frames, a frequency range into a plurality of sub-bands; and identifying and aggregating the channels containing the same audio object based on similarity of at least one of signal envelope and spectral shape among the plurality of sub-bands.

4. The method according to claim 1, further comprising:

generating a channel-based audio bed from the source audio content; and wherein generating the adaptive audio content comprises generating the adaptive audio content based on the at least one audio object and the audio bed.

5. The method according to claim 4, wherein generating the audio bed comprises:

decomposing the source audio content into a directional audio signal and a diffusive audio signal; and generating the audio bed from the diffusive audio signal.

6. The method according to claim 4, wherein generating the audio bed comprises:

creating at least one height channel by ambience upmixing the source audio content; and generating the audio bed from a channel of the source audio content and the at least one height channel.

7. The method according to claim 1, further comprising:

estimating metadata associated with the adaptive audio content.

8. The method according to claim 7, wherein generating the adaptive audio content comprises editing the metadata associated with the adaptive audio content.

9. The method according to claim 8, wherein editing the metadata comprises controlling a gain of the adaptive audio content.

10. The method according to claim 1, wherein generating the adaptive audio content comprises:

performing re-authoring of the at least one audio object, the re-authoring comprising at least one of:

separating audio objects that are at least partially overlapped among the at least one audio object;

modifying an attribute associated with the at least one audio object; and interactively manipulating the at least one audio object.

11. A computer program product, comprising a computer program tangibly embodied on a non-transitory machine readable medium, the computer program containing program code for performing the method according to claim 1.

12. A system for generating adaptive audio content, the system comprising:

an audio object extractor configured to extract at least one audio object from channel-based source audio content, wherein extracting the at least one audio object comprises:

decomposing the source audio content into a directional audio signal and a diffusive audio signal, wherein decomposing the source audio content comprises performing signal component decomposition on the source audio content and calculating a probability for diffusivity by analyzing the decomposed signal components; and extracting the at least one audio object from the directional audio signal; and an adaptive audio generator configured to generate the adaptive audio content at least partially based on the at least one audio object.

13. The system according to claim 12, wherein the audio object extractor comprises:

a spectrum composer configured to perform, for each of a plurality of frames in the source audio content, spectrum composition to identify and aggregate channels containing a same audio object; and a temporal composer configured to perform temporal composition of the identified and aggregated channels across the plurality of frames to form the at least one audio object along time.

14. The system according to claim 13, wherein the spectrum composer comprises:

a frequency divisor configured to divide, for each of the plurality of frames, a frequency range into a plurality of sub-bands; and wherein the spectrum composer is configured to identify and aggregate the channels containing the same audio object based on similarity of at least one of signal envelope and spectral shape among the plurality of sub-bands.

15. The system according to claim 12, further comprising:

an audio bed generator configured to generate a channel-based audio bed from the source audio content; and wherein the adaptive audio generator is configured to generate the adaptive audio content based on the at least one audio object and the audio bed.

16. The system according to claim 15, further comprising:

a signal decomposer configured to decompose the source audio content into a directional audio signal and a diffusive audio signal; and wherein the audio bed generator is configured to generate the audio bed from the diffusive audio signal.

17. The system according to claim 15, wherein the audio bed generator comprises:

a height channel creator configured to create at least one height channel by ambience upmixing the source audio content; and wherein the audio bed generator is configured to generate the audio bed from a channel of the source audio content and the at least one height channel.

18. The system according to claim 12, further comprising:

a metadata estimator configured to estimate metadata associated with the adaptive audio content.

19. The system according to claim 18, further comprising:

a metadata editor configured to edit the metadata associated with the adaptive audio content.

20. The system according to claim 19, wherein the metadata editor comprises a gain controller configured to control a gain of the adaptive audio content.

21. The system according to claim 12, wherein the adaptive audio generator comprises:

a re-authoring controller configured to perform re-authoring of the at least one audio object, the re-authoring controller comprising at least one of:

an object separator configured to separate audio objects that are at least partially overlapped among the at least one audio object;

an attribute modifier configured to modify an attribute associated with the at least one audio object; and an object manipulator configured to interactively manipulate the at least one audio object.

* * * * *